United States Patent [19]

Browning

[11] 4,277,260
[45] Jul. 7, 1981

[54] POWDER COLLECTORS

[76] Inventor: Jesse H. Browning, 4217 Via Pinzon, Palos Verdes Estates, Calif. 90274

[21] Appl. No.: 66,412

[22] Filed: Aug. 14, 1979

[51] Int. Cl.³ ...................... B01D 46/04; B05B 15/04
[52] U.S. Cl. .................................. 55/273; 55/287; 55/302; 55/335; 55/341 HM; 55/356; 55/378; 55/431; 55/481; 55/484; 55/502; 98/115 SB; 118/326; 118/DIG. 7
[58] Field of Search ................ 55/273, 283, 287, 302, 55/334, 335, 341 HM, 378, 379, 356, 422, 431, 481, 484, 502; 98/115 SB; 118/326, 603, 610, DIG. 7

[56] References Cited

U.S. PATENT DOCUMENTS

| 3,139,044 | 6/1964 | Cole | 118/603 |
|---|---|---|---|
| 3,166,391 | 1/1965 | Keser | 55/273 |
| 3,204,390 | 9/1965 | Heyl | 55/341 HM |
| 3,295,298 | 1/1967 | Mackey | 55/379 |
| 3,377,783 | 4/1968 | Young | 55/302 |
| 3,385,033 | 5/1968 | Basore et al. | 55/302 |
| 3,394,532 | 7/1968 | Oetiker | 55/302 |
| 3,421,295 | 1/1969 | Swift et al. | 55/302 |
| 3,719,030 | 3/1973 | Blankemeyer et al. | 55/356 |
| 3,777,706 | 12/1973 | Kaufman | 118/326 |
| 3,791,111 | 2/1974 | Kroll | 55/379 |
| 3,905,785 | 9/1975 | Fabre | 98/115 SB |
| 3,908,720 | 9/1975 | Garnett | 55/431 |
| 3,944,404 | 3/1976 | Andrasfalvy | 55/302 |
| 4,171,963 | 10/1979 | Schuler | 55/302 |
| 4,174,204 | 11/1979 | Chase | 55/283 |

FOREIGN PATENT DOCUMENTS

546878 8/1942 United Kingdom ................ 55/302

Primary Examiner—David L. Lacey
Attorney, Agent, or Firm—Blakely, Sokoloff, Taylor & Zafman

[57] ABSTRACT

Powder collectors for the automatic collection and recycling of powders such as in a powder coating booth are disclosed. The collectors utilize a rollaway collection assembly having one or more cartridge filters therein so as to allow the quick change of vector assemblies on the coating booth for color change convenience. The cartridges themselves may also be readily changed as they preferably are not rigidly mounted to the collection assembly but instead merely sole positioned therein as to become functional upon turning on the air flow for the collection system. Continuous operation is provided by periodic blow-down of the cartridges with a fluidized bed providing automatic recycling (or disposal in the case of dust collection systems) of the collected powder. Various embodiments are disclosed including one embodiment utilizing envelope filters with an automatic blow-down provision.

27 Claims, 15 Drawing Figures

POWDER COLLECTORS

BACKGROUND OF THE INVENTION

1. Field of the Invention

The present invention relates to the field of powder and dust collection systems and more particularly to the systems of the stated type for use in powder coating systems and commercial dust collection systems generally.

2. Prior Art

For many manufactured goods it is necessary to paint one or more surfaces thereof so as to provide a decorative and/or protective coating to the surface. Conventional paints, however, are not too easy to apply on a production basis as lack of accurate control of the coating thickness may result in runs or inadequate coating of the article being painted. This is particularly true of parts having complex shapes, which encourage uneven coating thicknesses. Further, the commonly used paint solvents necessary to allow proper spraying of the paint are expensive and do not add to the coating, present a fire hazard, and particularly in recent years are highly restricted because of environmental considerations. Further, solvent base paints generally require some time at a specified temperature for the proper curing thereof, a manufacturing disadvantage. Even if the time element could be eliminated, the efficiency of the spray painting process is less than optimum because of the substantial over-spray often encountered, depending in part on the experience of the painter and the shape of the part being painted.

Processes for coating parts with a solid resin coating provide other decorative and/or protective coating techniques, and have found ever increasing application in recent years because of their many advantages over ordinary solvent base paints. In accordance with these processes, the resin coating is prepared in a powder form and sprayed on the parts to be coated much like a liquid paint. The parts, however, are generally connected to one electrode of a direct current power supply, with an electrode of opposite polarity being provided at the orifice of the spray gun so that the part to be coated and the spray are given opposite charges. This results in electrostatic attraction between the powder and the parts to attract the powder to the surface and keep it temporarily clinging thereto. Typically, as the powder builds up on the part, the electric charge on the part is offset by the opposite charge of the powder so that when the powder coating of the desired thickness is achieved, the electrostatic attraction is reduced to zero, thereby allowing additional powder to merely fall off the part. This self-limiting characteristic of the powder makes it much easier to cover hard to get at areas without overcoating adjacent areas. Since the resin will melt at an elevated temperature to provide the desired coating, such processes generally have the advantage of not requiring substantial time at elevated temperature, thereby minimizing the "curing" equipment requirements.

The resin powder (hereinafter referred to simply as "powder") is generally sprayed in a powder spray booth provided for this purpose, with the parts to be coated being hung on a conveyor so as to pass through the spray booth at an appropriate speed. Such spray booths are generally provided with some form of collection or filtering system, whereby the overspray and excess powder falling off of the parts may be collected for reuse and/or to avoid environmental contamination. For this purpose, an air flow system is generally provided whereby air (and powder) are withdrawn from the spray booth area into a plenum wherein much of the powder will settle out. The remaining powder is generally filtered out of the air stream by appropriate filters provided for this purpose. Generally, the powder that settles out of the air is recycled while that filtered out by the filters may or may not be recycled, depending upon the specific design of the equipment.

Various types of filters have been used in the prior art. By way of example, bag type filters have been commonly used in such equipment, such filters generally comprising long, small diameter filter bags over appropriate filter tubes, with an appropriate fan withdrawing air from the center of the filter tubes so as to cause a flow generally directed inward through the filter tubes so that the dust filtered out collects on the outer surface of the tubes. It is also known in such equipment to occasionally provide a pulse of air in a reverse flow direction through the filter bags to essentially blow the bags clean, whereby much of the powder blown therefrom will settle out for recycling. Generally speaking, fluidized beds may be used to fluidize the powder which has settled out for recycling. Such fluidized beds generally have a porous member, which allows the injection of air into the powder to essentially expand the powder and allow the particles thereof to flow over each other, thereby resulting in flow characteristics much like ordinary fluids.

The foregoing equipment performs well in an ordinary production environment wherein only a single color is to be applied, or at least in situations wherein color changes are at most infrequent. However, in instances wherein frequent color changes are required, substantial down time may result. In particular, at least in the type of equipment utilizing periodic blow down to clean the filter bags, the filter bags cannot be cleaned well enough to allow the change of color without changing the filter bags also. This, coupled with the fact that prior art equipment of this type normally has the filter, mounting structure, etc. fastened to the spray booth itself, makes color changing a messy and time consuming operation.

Another type of dust collector which has been used on powder spray equipment is comprised of a plurality of envelope filters. These filters are fabricated of the same material as bag filters, but are generally in the form of an envelope, having two large parallel face panels integrally joined along three edges, with the fourth edge being left open so as to be mountable over a porous support member through which air is drawn. Thus in filters of this type, the dust filtered thereby is collected on the outer surfaces of the envelope filters. Filters of this type have the advantage of providing a large filtering surface area in a reasonably compact space, as a relatively large number of these filters may be positioned relatively close together in a filter assembly. Such filters have been mounted on a separate cart, releaseably attachable to a powder spray booth, so as to allow the quick removal of one filter cart and the replacement thereof with another filter cart. Filters of this type, however, have heretofore had the disadvantage that they could not be conveniently cleaned, thereby normally resulting in the loss of the powder which is filtered out rather than settling out of the air stream, and also resulting in periodic down time for removal and replacement.

BRIEF SUMMARY OF THE INVENTION

Powder collectors for the automatic collection and recycling of powders such as in a powder coating booth are disclosed. The collectors utilize a rollaway collection assembly having one or more cartridge filters therein so as to allow the quick change of filter assemblies on the coating booth for color change convenience. The cartridges themselves may also be readily changed as they preferably are not rigidly mounted to the collection assembly but instead are positioned therein so as to become functional solely and merely upon turning on the air flow for the collection system. Continuous operation is provided by periodic blowdown of the cartridges with a fluidized bed providing automatic recycling (or disposal in the case of dust collection systems) of the collected powder. Various embodiments are disclosed including one embodiment utilizing envelope filters with an automatic blow-down provision.

DETAILED DESCRIPTION OF THE INVENTION

First referring to FIGS. 1 through 5, a first embodiment of the present invention may be seen. This embodiment is intended for use as a powder coating booth for applying hot melt powder on a production line basis, and includes provision for the automatic recovery and recirculation of the airborne powder in the system. The booth itself is of generally conventional design, being elevated on legs 20 so as to be generally higher than the detachable collection assembly, generally indicated by the numeral 22. The booth itself is generally comprised of a rectangular enclosure 24 having entry ports 26 at each end thereof through which the article to be coated may be transported. Typically in such equipment the articles to be coated (not shown in the drawings) are generally hung from a conveyor system 28 on hooks 30, moving slowly through the spray booth so that an operator may spray the part with a powder spray gun through an opening 32 in the side of the booth.

Figure 1:
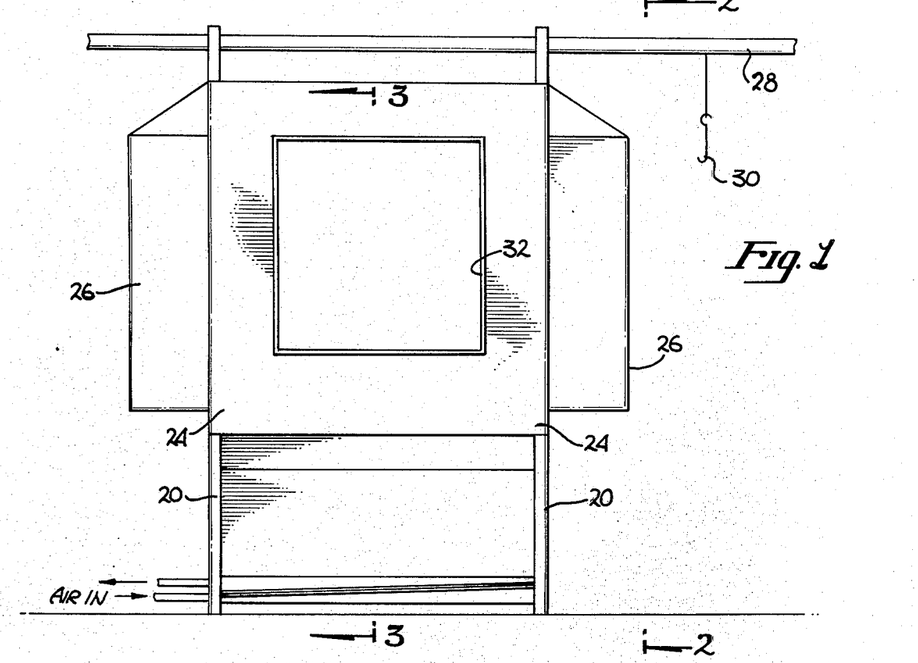
FIG. 1 is a front view of one embodiment of the present invention.
Figure 2:
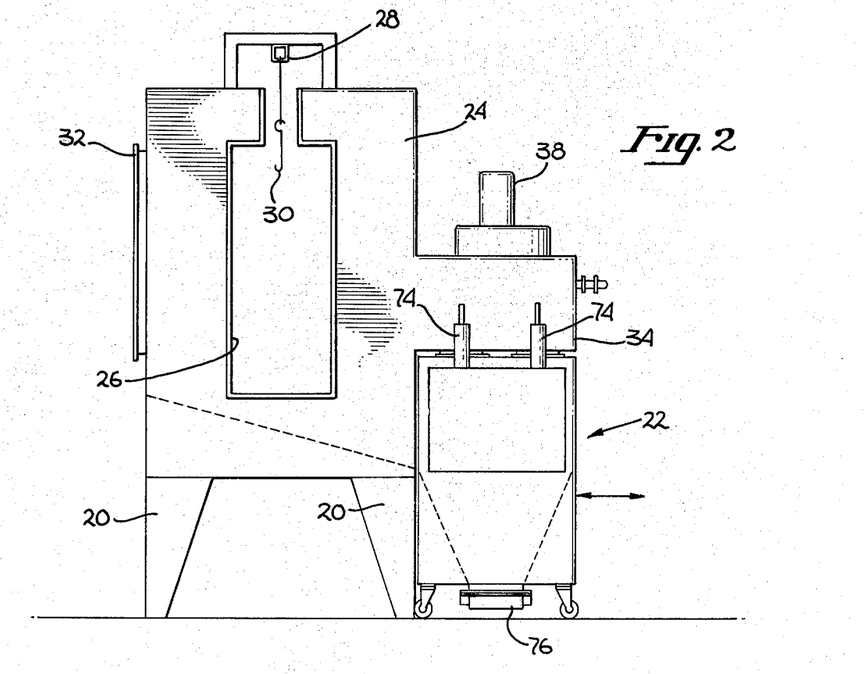
FIG. 2 is an end view of the embodiment of FIG. 1.
Figure 3:
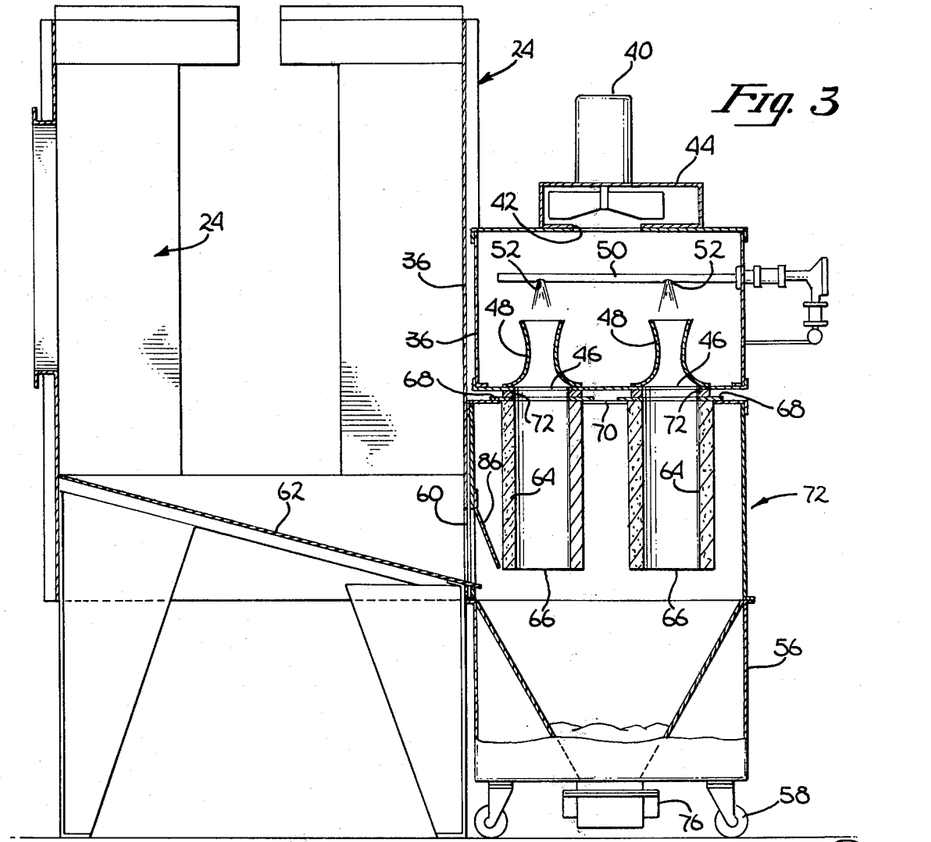
FIG. 3 is a view taken along line 3—3 of FIG. 1.

Coupled to the back of the booth at an elevated position is a chamber 34, the chamber being structurally coupled to the spray booth 24 but being isolated therefrom by intermediate walls 36. At the top of the chamber 34 is a centrifugal blower 38 driven by motor 40 in communication with the chamber 34 through an opening 42 in the top thereof. The blower 38 is mounted within a duct 44, which in a typical installation would either be vented to the room within which the equipment operates or vented outside, with a silencer commonly being used for noise rejection purposes. Thus it may be seen that the blower 38 will tend to pull air out of chamber 34, more specifically through openings 46 in the bottom of the chamber. Surrounding the openings 46 are a pair of velocity stacks 48 which aid in the blowdown function hereinafter described. Finally, positioned above the velocity stacks and within chamber 34 are high pressure lines 50 having ports 52 above the velocity stacks so as to controllably discharge high pressure air downward toward the velocity stacks, as controlled by solenoid valves 54 on the inlet thereto.

In this embodiment the foregoing structure is generally part of the spray booth assembly, with the chamber 34 being directly coupled to the back thereof. As an alternate thereto, chamber 34 could be made as a free standing assembly for positioning immediately behind the spray booth if such a configuration were preferred. In any event, however, the chamber 34 in this embodiment does not communicate with the interior of the spray booth chamber 24 except through the collector assembly 22. This collector assembly is comprised of a generally rectangular enclosure 56 supported on wheels or rollers 58 for convenient positioning and removal adjacent the back of the spray booth. The enclosure 56 is generally closed except for circular openings which align with the velocity stacks 48 when positioned as shown in the figures and also except for an opening 60 which communicates with the bottom of the spray booth. In that regard it will be noted that the bottom surface 62 of the spray booth is sloped toward the collector assembly 22 so as to encourage the movement of any particles falling out of the airstream toward the collector assembly.

Figures 4, 5:
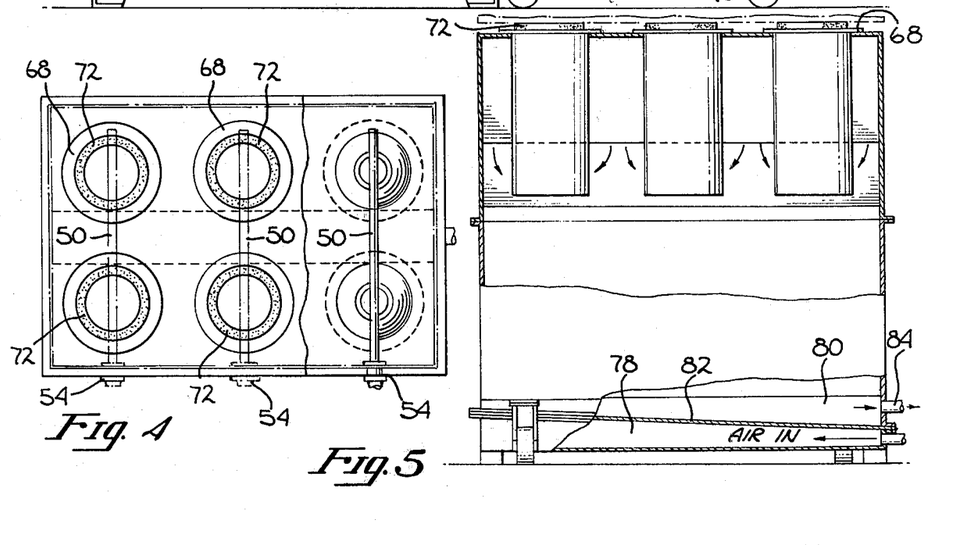
FIG. 4 is a top view of the collector assembly of the embodiments of FIGS. 1 through 3.
FIG. 5 is a side view of the collector assembly.

Mounted within the openings in the top of the collector assembly 22 and just below the velocity stacks 48 are cartidge filters 64. These cartridge filters have a bottom plate 66 to close off the lower end thereof and have a flange 68 adjacent the top thereof for resting on the top plate 70 of the enclosure 56 to vertically support the filters. In addition the filters have a soft rubber ring 72 on the top thereof which as shall subsequently be seen provide a relatively air tight seal between each filter and the bottom of chamber 34, so that substantially all of the air withdrawn upward through velocity stacks 48 must be drawn radially through the cartridge filters 64. Cartridge filters of this general type are manufactured by a relatively large number of manufacturers and are generally used for various purposes. By way of specific example, this type of filter is commonly used for air intake filters for large diesel trucks, and in fact can even be rebuilt for reuse by various companies specifically in this business. One such manufacturer is Air Refiner, Oklahoma. Such filters are available with or without end plates 66, though commonly not provided with the flanges 68 by the manufacturer thereof. The flanges 68, however, may be welded to the outer shell of the filters or alternatively may be in the form of a circular clamp so as to be interchangable between filter elements. In normal operation the leakage between seals 72 in the bottom of chamber 34 is relatively small even with a loose fitting seal. However, in order to lock the collector assembly 22 in position and to provide a better seal against the top of the filters, toggle clamps 74 (FIG. 2) may be used to lift the collector assembly 22 and to clamp it to the structure of chamber 34 which in turn assures a highly adequate seal around the top of the filters. Such clamps are readily commercially available, being offered by various manufacturers, including by way of example, Lapeer Manufacturing Company of Lapeer, Michigan.

In this embodiment a means for providing a fluidized bed 76 is used at the bottom of the collector assembly 22 to provide for the automatic recycling of the recovered powder. As may be best seen in FIG. 5, the fluidized bed is comprised of a lower region 78 into which air is blown, and an upper region 80 in which the powder collects. The upper and lower regions are separated by a porous panel 82 so that the air provided in the lower region 78 may flow therethrough to fluidize or expand the powder with air so that the powder-air combination will flow outward through port 84 like a fluid rather than compacting. Suitable porous materials for fabricating such fluidized beds, such as by way of example, filter grade vylon manufactured by Atlas Minerals and Chemicals, Inc. of Mertytown, Pennsylvania are readily commercially available.

In operation blower 38 draws air from the top of chamber 34 which in turn withdraws air from the center of the filters 64 through the velocity stacks 48. This creates a flow of air into the spray booth 24 through the open regions thereof which carries with it the overspray through the opening 60 into the collection assembly. Since the airflow velocities in the collection assembly are relatively low because of the large volume thereof, the majority of powder in the powder ladden air will settle out by itself to become part of the powder on the fluidized bed. The remaining airborne powder will be filtered out by the filters 64 as the air flows therethrough (in order to avoid direct impingement of the powder ladden air coming from the spray booth directly onto the filters a baffle plate 85 may be used in the vicinity of each filter to deflect the flow at that region). Periodically the valve 54 is momentarily turned on with the high pressure air directed through ports 52 entraining additional air as it flows through the velocity stacks 48 to create a short, relatively high volume reverse flow blast of air through the filter cartridges to knock loose most of the powder collected thereon.

One of the advantages of this embodiment is the ease with which filters and/or color changes can be made. In particular, for the mere changing of filters, the collector assembly need only be loosened from the bond and rolled back so as to allow the filters to be lifted therefrom. To change colors in a spray booth one needs only to blow off the inner walls of the booth to remove any powder residue and to them remove the collector assembly 22 and roll up another collector assembly with the new color powder therein. Thus color changes can be made in a matter of minutes as opposed to requiring a matter of hours to change filters etc. as in prior art bag filter type equipment.

Figures 6, 13, 14:
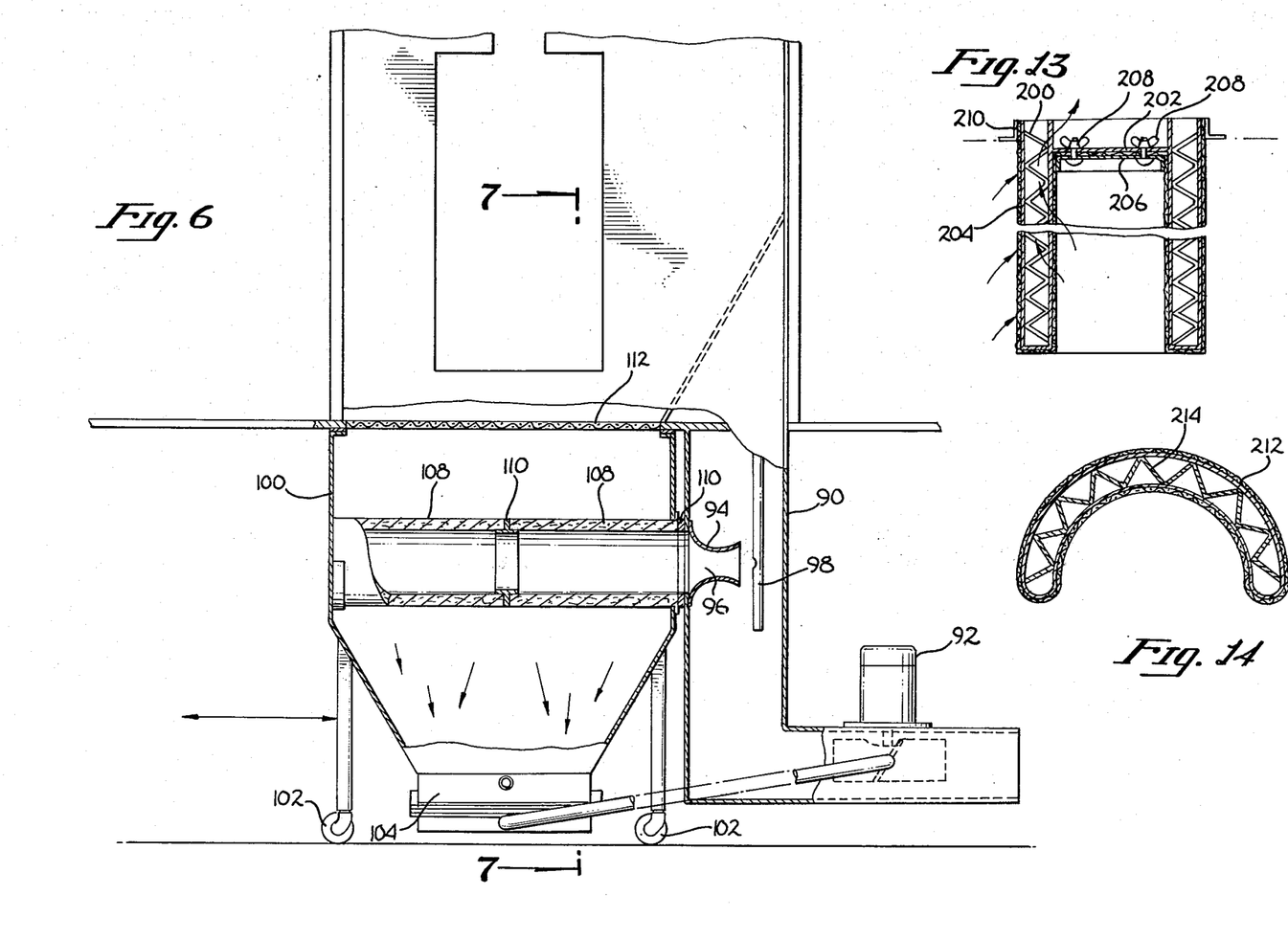
FIG. 6 is an end view partially cut away of an alternate embodiment.
FIGS. 13 through 15 are exemplary illustrations of alternate filler cartridge forms.
Figure 7:
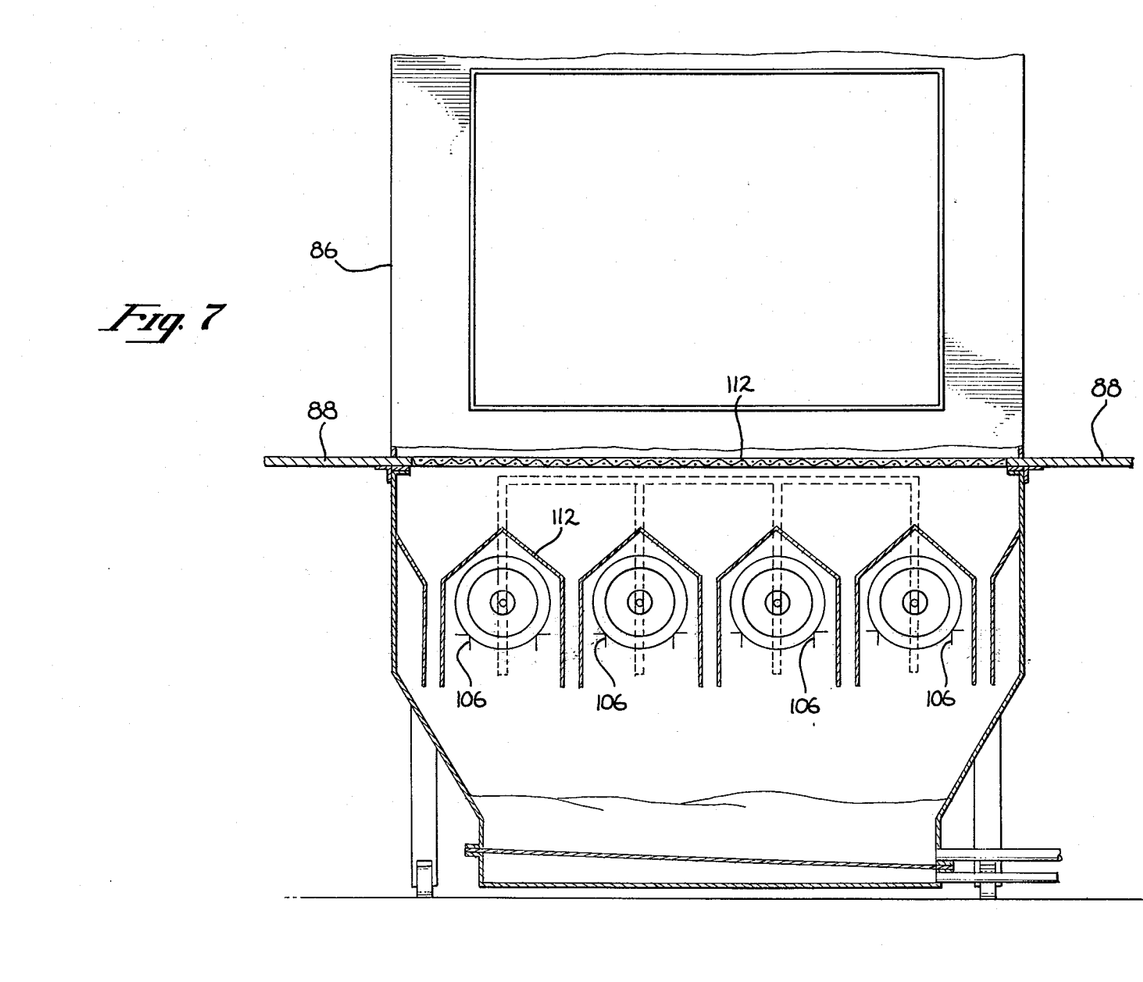
FIG. 7 is a view taken along lines 7—7 of FIG. 6.

Now referring to FIGS. 6 and 7, an alternate embodiment utilizing the same general concepts may be seen. This embodiment is particularly suited for the spray coating of large objects and can generally be fabricated of any convenient size depending upon the requirements of a particular application. In accordance with this embodiment the spray booth 86 is a room-like structure which may be supported on an intermediate floor 88 or some other self-supporting structure. The floor of the spray booth is a generally open structure allowing an operator to walk around therein to spray the various sides of an article to be coated without interfering with the passage of the powder downward through the floor to a collector assembly therebelow. Flooring materials such as expanded steel with appropriate support provisions are suitable for this purpose.

Disposed below the support structure 88 is a manifold duct 90 having a motor blower combination 92 thereon and also having therein a plurality of horizontally disposed velocity stacks 94 coupled to the wall of the duct 90 surrounding openings 96 therein. Also mounted within the duct 90 are high pressure lines 98 for creating a momentary reverse flow in the filter cartridges as in the first-described embodiment.

In this embodiment the collection assembly 100 is generally similar in functional respects to the collection assembly 22 of the previously described embodiment, being supported on wheels 102 for the convenient movement thereof and having a means for providing a fluidized bed 104 at the bottom thereof for the automatic recirculation of the recovered powder. Instead of the vertically oriented cartridges, however, the cartridges are oriented horizontally and supported by support members 106. The cartridges are not fastened into the collection assembly but instead merely slide in from the right side as shown in FIG. 6, being maintained in position by the clamping of the collection assembly to the structure of duct 90. Thus as before, the color being sprayed may be easily changed by rolling away one collection assembly and bringing another collection assembly into position and/or the cartridges changed by merely sliding the cartridges out and sliding in new cartridges. In that regard it will be noted from FIG. 6 that the embodiment depicted therein shows two cartridges 108, though of course the number of cartridges may range from one to any reasonable larger number based upon the size of the spray booth and the size of the cartridges used. For convenience, the rubber seal 110 which is cemented to the end of the right cartridge for sealing against the wall of duct 90 may also be used between cartridges and at the opposite end of the line of cartridges so that all cartridges in a given system may be of the same configuration (i.e. open at both ends and having a rubber seal at one end thereof). Also in order to avoid direct impingement of the powder passing through the floor 112 of the spray booth each of the cartridges is shielded from direct impingement thereon by sheet metal shields 113 disposed thereover. Thus this embodiment can be built in substantially any size and yet still preserve the features of rapid color change capability and simple slip-out cartridge filters in an automatic recycling powder collection system.

Figure 8:
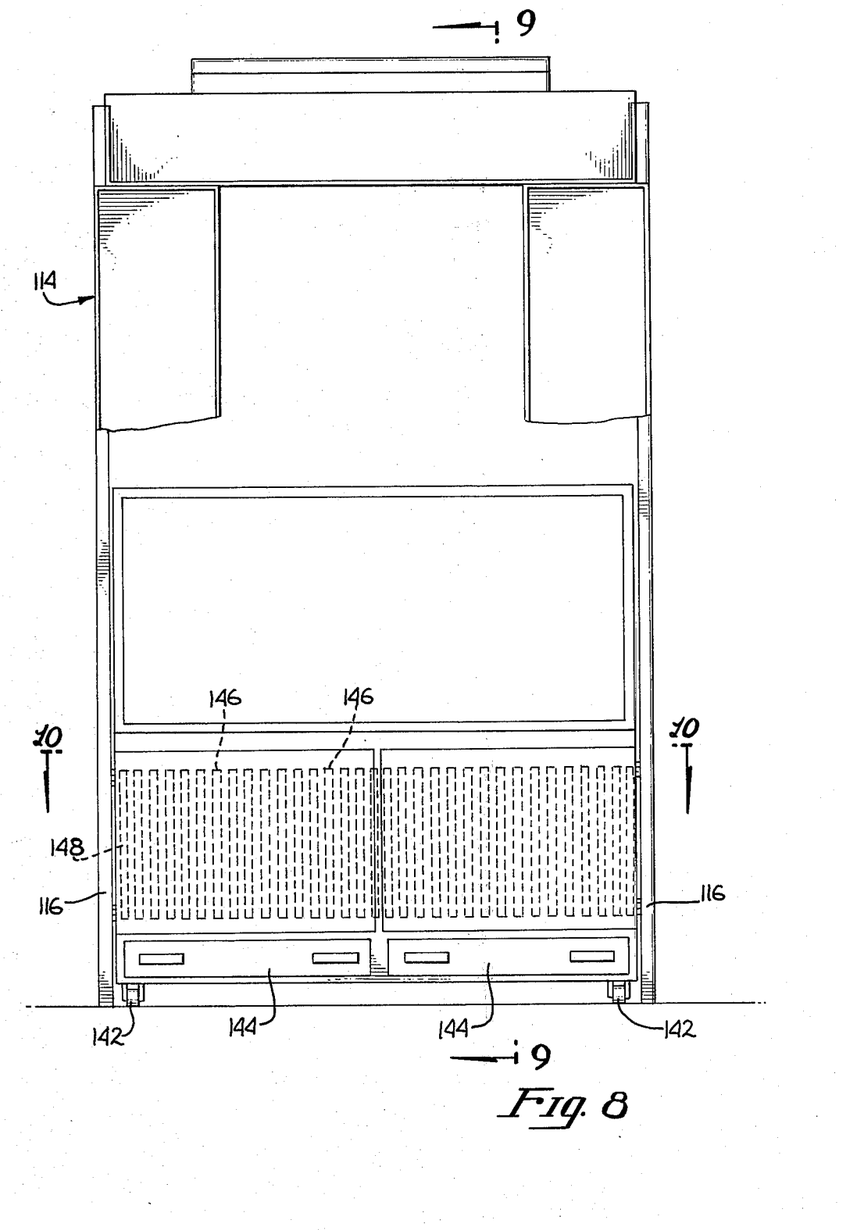
FIG. 8 is an end view of a still further alternate embodiment.
Figure 9:
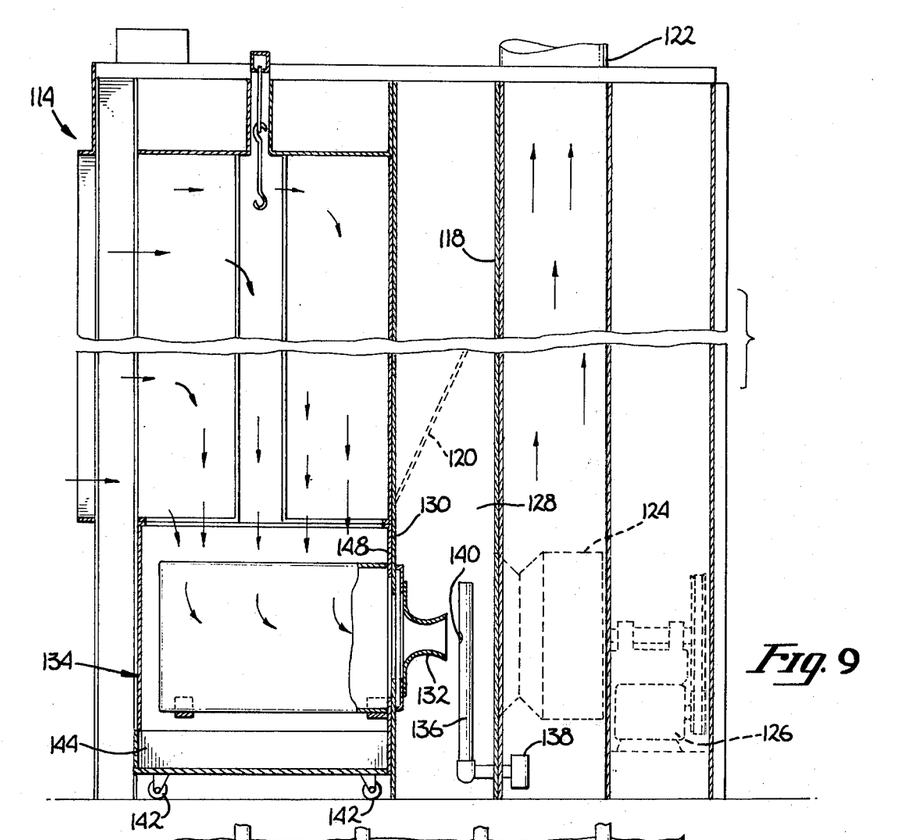
FIG. 9 is a view taken along line 9—9 of FIG. 8.
Figure 10:
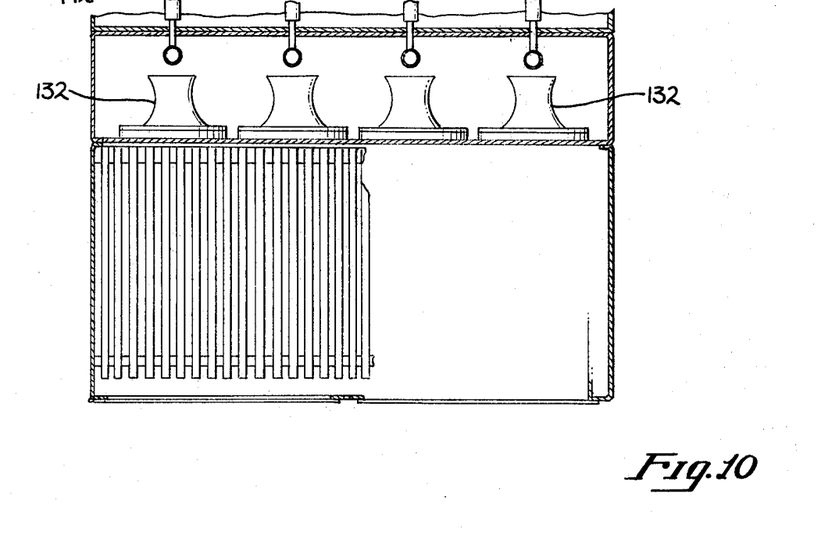
FIG. 10 is a view taken along line 10—10 of FIG. 8.

Now referring to FIGS. 8 through 10, still another embodiment of the invention may be seen. This embodiment also preserves the feature of the rollaway collector assembly having a periodic filter perge capability, but does so using envelope filters. In particular, a spray booth generally indicated by the numeral 114 is supported on legs 116 with the back of the spray booth 114 being closed by a back wall 118 and sloped portion 120. (See FIG. 9). Behind the back wall 118 is a duct 122, with a blower 124 driven by motor 126, both shown in phantom in FIG. 9, to exhaust air from region 128 out through duct 122. Wall 130, below member 120 is provided with a plurality of velocity stacks 132 positioned over cooperatively disposed openings in wall 130. The velocity stacks 132 are generally shaped so as to define a nearly square or rectangular flow area therethrough into the removable collector assembly, generally indicated by the numeral 134. As before, lines 136 coupled to a high pressure source through solenoid valves 138 are provided with a ports 140 for admitting a short blast of high pressure air in a reverse direction through the velocity stack, as controlled by the solenoid valves 138.

The collection assembly 134 is a cart-like assembly supported on rollers 142 for the easy movement thereof independent of the rest of the structure. The collector assembly is basically a rectangular enclosure having a pair of drawers 144 at the bottom thereof for collecting the re-covered powder. A plurality of envelope filters 146 are disposed thereabove, the filters having walls held in a spaced apart position by a metallic filler therefor and clamped to the end 148 of the collector assembly. With this configuration the blower 124 exhausts region 128 which pulls air and powder down from the spray booth 114 and onto the outer surface of the envelopes. By pulsing the solenoid valves 138 periodically a blast of air is forced outward through the envelope to both blow powder therefrom and to physically shake the envelope to shake powder therefrom for subsequent collection in the drawers 144. Preferably in this embodiment and if desired in the other embodiments hereinbefore described only one section of the filters i.e. one velocity stack is blown down at any one time so that the reverse flow thereby induced is temporarily induced in only a portion of the filter area as opposed to the entire filter area. This is preferable as it provides lesser requirements on the supply of the high pressure air and avoids momentary reverse flow of air throughout the collection and spray booth system.

Figure 11:
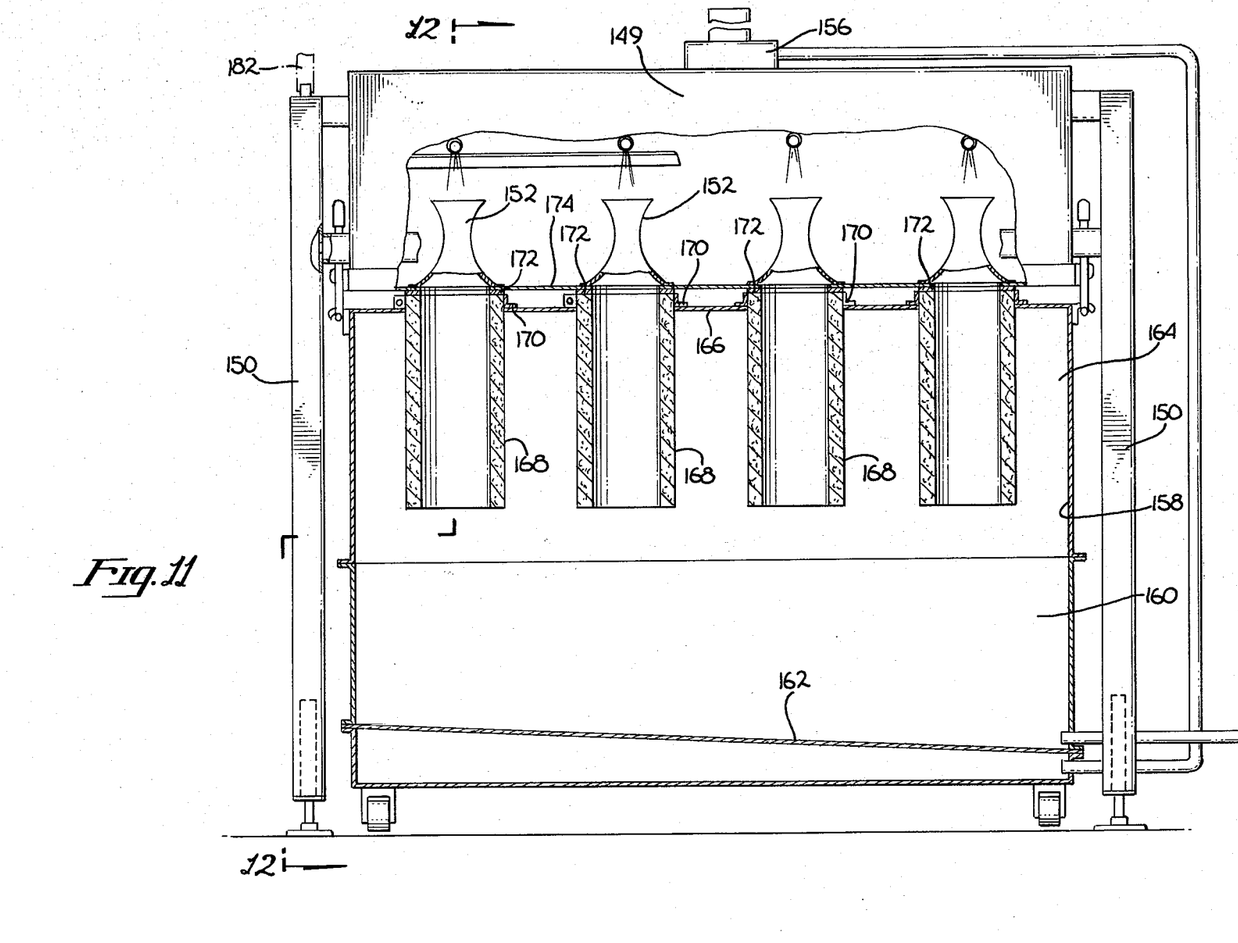
FIG. 11 is a side view partially cut away of a still further alternate embodiment dust collection system.
Figure 12:
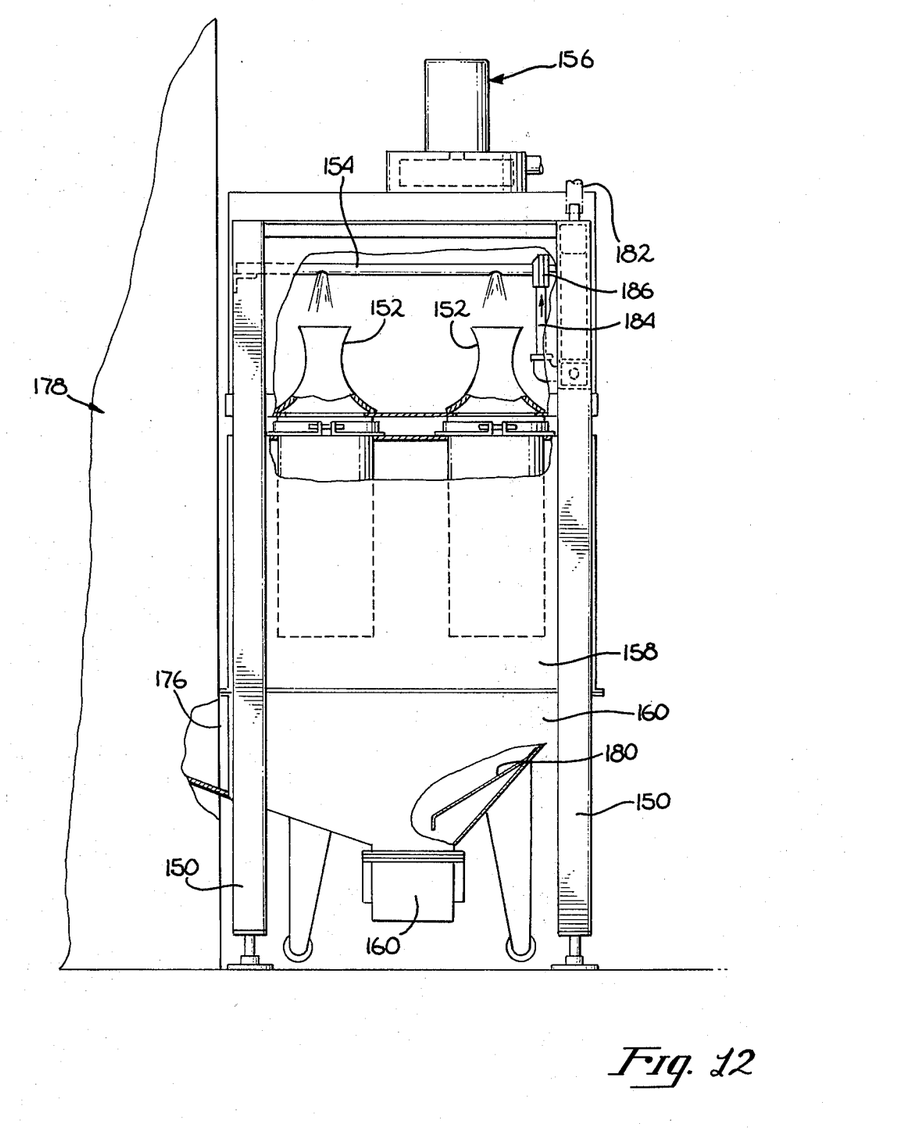
FIG. 12 is an end view of the dust collection system of FIG. 11.

Now referring to FIGS. 11 and 12, a final embodiment of collection system may be seen. This system is generally a self-standing system which may be used in conjunction with powder spray booths or dust or powder collection systems in general. Thus the collection system comprises an upper assembly 149 standing on adjustable legs 150 and incorporating velocity stacks 152, high pressure reverse air flow line 154, and preferably a blower assembly 156. Mountable below the upper assembly 149 is a collection assembly 158 which includes a lower chamber region 160 below which is mounted a fluidized bed 162 and an upper region 164 having a top plate 166 provided to receive a plurality of cartridge filters 168. The cartridge filters are each supported by a piece of angle iron 170 formed into an incomplete ring with a bolt extending between the two ends of the angle iron for clamping the ring around the outer diameter of the respective cartridge. Of course as before, a rubber member 172 is fastened to the top of each cartridge to seal against the bottom plate 174 of the upper assembly 149. In this embodiment the lower chamber 160 is open as at port opening 176 so as to communicate with an adjacent chamber generally indicated by a numeral 178 which could be a powder spray booth or an intake duct for dust collection in general, such as, by way of example various toxic and/or other dust as are commonly collected and filtered out for environmental control purposes. One of the principal advantages of this particular embodiment is the relatively low intake port opening 176 which could be configured to essentially take in the air to be filtered at nearly floor level. In that regard, because of the low intake level, it has been found preferable to put a baffle 180 in the lower chamber 160 to alter the air flow in the region of the fluidized bed so that the dust settling out is generally centered on the bed.

There have been disclosed herein various embodiments of new and unique dust collection systems particularly useful in conjunction with powder coating booths which utilize cartridge filters maintained in position in collector assemblies by the mating thereof with an evacuation system. In the preferred embodiment the systems further include the periodic purging of the filter cartridges by the creation of a momentary reverse flow therethrough and for the fluidization of the dust thereby collected for automatic recycling so as to provide fully automatic and unattended operation. In one form automatic operation is preserved, though the filter elements are envelope filters rather than cartridge filters. Also, even those embodiments utilizing the cartridge filters have various alternate forms, disclosed as exemplary forms only, such as, by way of example, in the embodiment of FIGS. 11 and 12, the high pressure air for the cartridge purge is brought in through line 182 and ducted through part of the frame assembly 150 to lines 184, valves 186 and lines 154. Valves 186 of course are controlled by conventional time clocks or time delay circuits well known in the art.

Figure 15:
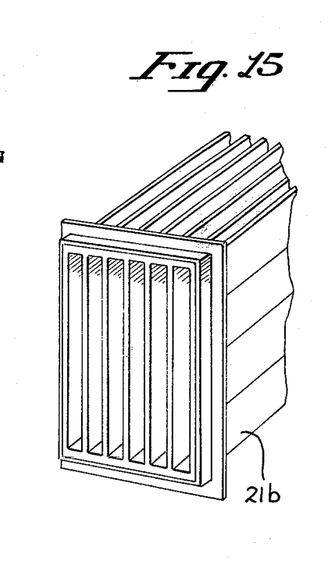

Many of the embodiments hereinbefore described have been described with respect to the use of cartridge filters which are commercially available in a large variety of sizes and characteristics. It should be noted, however, that cartridge filters may be effectively fabricated using various techniques to provide even greater design flexibility, cost or convenience. By way of example, FIG. 13 illustrates a cross section of a filter cartridge which may be readily serviced by the user. Such a "cartridge" is comprised of a highly pervious support structure 200 having a closure plate 202 spaced somewhat inward from one end of the filter. A bag-type filter element 204, preferably having a stepped diameter with the smaller cylindrical portion thereof having a closed end, fits over the outer surface of the supporting structure 200 and folds back so as to cover a large part of the inner surface of that structure. The closed end of the filter element in this exemplary form may be retained in position by retaining plate 206, held in position by a plurality of screws and wing nuts 208. The other or open end of the filter element 204 may be retained in position by the clamp 210 which also defines the flange for location of a cartridge in the collector. Such cartridges obviously may be made in any desired size with the filter element being readily removable for washing and/or replacement as required. Also given this form of cartridge filter, the cross section of the filter may be varied as desired. By way of example, if desired the supporting structure 200 may be closed at the lower end thereof so that when covered with the appropriate filter element, the outer surface is a filter surface. Also obviously other cross sections may be used, such as by way of example, that shown in FIG. 14, wherein the filter element 212 surrounds an arc-like supporting structure 214 to provide a substantial filter area in a relatively low profile cartridge-like element. The cloth filter 212 may be fastened to the concave surface of the supporting structure, or alternatively, may be drawn into that position by the air flow therethrough, as the blow down is typically so rapid that motion of the filter material during blow down will be relatively minimal. Finally, of course, rectangular cross sections can be used, such as in the filter cartridge of FIG. 15. The ability to use such a rectangular filter element 216 in the present invention allows the adaptation of various types of commercially available filter elements, such as the Flo-Pack air cleaners manufactured by the Florence Filter Corporation of Compton, California and the high efficiency particulate air filters, also manufactured by that company.

Thus, while various preferred embodiments of the present invention have been disclosed and described herein, it will be understood by those skilled in the art that various changes in form and detail may be made therein without departing from the spirit and scope of the invention.

I claim:

1. A collector comprising:
   a housing defining a first chamber having means for coupling to an exhaust duct, said housing including support structure and having therein at least one velocity stack means disposed adjacent a first chamber intake opening in said housing, said housing also having high pressure means for controllably directing a blast of air through said at least one velocity stack means and out said first chamber intake opening;
   a collector assembly structurally independent of said housing and defining a second chamber having disposed therein at least one filter element which is structurally supported entirely by said collector assembly, said second chamber having a first opening for cooperating with a mating opening in a housing structure containing particulate laden air to be filtered, and at least one second opening adjacent said at least one filter element and cooperatively disposed with respect to said first chamber intake opening, so that air must pass through said at least one filter element to pass through said at least one second opening, said second chamber being mobile so as to be readily moveable with respect to said first chamber; and
   a manually operable means for coupling said collector assembly to said first chamber and simultaneously therewith sealingly engaging said at least one filter element with said at least one first chamber intake opening for communication with said at least one velocity stack means.

2. The collector of claim 1 wherein said first chamber includes a motor-blower assembly for expelling air through said means for coupling to an exhaust duct.

3. The collector of claim 1 wherein said at least one filter element comprises a plurality of envelope filter elements.

4. The collector of claim 3 wherein said at least one velocity stack means comprise a plurality of velocity stacks and said high pressure means is a means for controllably directing a blast of air through each of said velocity stacks, said blast of air being controlled by said high pressure means so as to be directed through less than all of said velocity stacks at any one time, said plurality of envelope filter elements being disposed in groups, each group being positioned for communication with a respective one of said velocity stacks.

5. The collector of claim 4 wherein said high pressure means is a means for controllably directing a blast of air through one of said velocity stacks at any one time.

6. The collector of claim 1 wherein said collector assembly has wheels on the bottom thereof for rolling to and from said first chamber.

7. The collector of claim 1 wherein said at least one filter element is at least one cartridge filter.

8. The collector of claim 7 wherein said at least one cartridge filter is insertable into said collector assembly through said at least one second opening in said collector assembly and is retained therein by the proximity of said first chamber and said collector assembly and is freely removable therefrom upon removal of said collector assembly from proximate said first chamber.

9. The collector of claim 8 further comprising a flexible seal between said at least one cartridge filter and said first chamber.

10. The collector of claim 8 wherein said at least one cartridge filter is insertable into said collector assembly with the axis of said at least one cartridge filter being generally vertical.

11. The collector of claim 8 wherein said at least one cartridge filter is insertable into said collector assembly with the axis of said at least one cartridge filter being generally horizontal.

12. A powder spray booth and powder collector system comprising:
    a spray booth means defining a vented area within which an article to be coated may be sprayed, said spray booth means having a spray booth opening through which powder and air may be withdrawn;
    a housing defining a first chamber having means for coupling to an exhaust duct, said housing having therein at least one velocity stack means disposed adjacent a first chamber intake opening in said housing, said housing also having high pressure means for controllably directing a blast of air through said at least one velocity stack means and out said first chamber intake opening;
    a collector assembly structurally independent of said housing and defining a second chamber having disposed therein at least one filter element which is structurally supported entirely by said collector assembly, said second chamber having a first opening for cooperating with said spray booth to receive powder entrained in air to be filtered therefrom, and at least one second opening adjacent said at least one filter element and cooperatively disposed with respect to said first chamber intake opening so that air must pass through said at least one filter element to pass through said second opening, said second chamber being mobile so as to be readily movable with respect to said first chamber; and
    a manually operable means for coupling said collector assembly to said first chamber and simultaneously therewith sealingly engaging said at least one filter element with said at least one first chamber intake opening for communication with said at least one velocity stack means.

13. The system of claim 12 wherein said first chamber and said spray booth means comprise a unitary structure.

14. The system of claim 12 wherein said first chamber includes support means whereby said first chamber and said spray booth means may be disposed with respect to each other for said first chamber intake opening to communicate with said spray booth opening.

15. The system of claim 12 wherein said first chamber is generally above said collector assembly.

16. The system of claim 12 wherein said first chamber is generally beside said collector assembly.

17. The system of claim 12 wherein said collector assembly is generally below said spray booth means.

18. The system of claim 17 wherein said first chamber is generally beside said spray booth means.

19. The system of claim 12 wherein said first chamber includes a motor-blower assembly for expelling air through said means for coupling to an exhaust duct.

20. The system of claim 12 wherein said at least one filter element comprises a plurality of envelope filter elements.

21. The system of claim 20 wherein said at least one velocity stack means comprise a plurality of velocity stacks and said high pressure means is a means for controllably directing a blast of air through each of said velocity stacks, said blast of air being controlled by said high pressure means so as to be directed through less than all of said velocity stacks at any one time, said plurality of envelope filter elements being disposed in groups, each group being positioned for communication with a respective one of said velocity stacks.

22. The system of claim 21 wherein said high pressure means is a means for controllably directing a blast of air through one of said velocity stacks at any one time.

23. The system of claim 21 wherein said collector assembly has wheels on the bottom thereof for rolling to and from said first chamber.

24. The system of claim 21 wherein said at least one filter element is at least one cartridge filter.

25. The system of claim 24 wherein said at least one cartridge filter is insertable into said collector assembly through said at least one second opening in said collector assembly and is retained therein by the proximity of said first chamber and said collector assembly and is freely removable therefrom upon removal of said collector assembly from proximate said first chamber.

26. The system of claim 25 further comprising a flexible seal between said at least one cartridge filter and said first chamber.

27. The system of claim 25 wherein said at least one cartridge filter is insertable into said collector assembly with the axis of said cartridge filter being positioned generally horizontal.

* * * * *